United States Patent
Nubani et al.

(10) Patent No.: US 7,673,061 B2
(45) Date of Patent: Mar. 2, 2010

(54) METHOD AND APPARATUS FOR NEIGHBORHOOD DISCOVERY ACROSS DISPARATE POINT-TO-POINT NETWORKS

(75) Inventors: Samer I. Nubani, Santa Clara, CA (US); Mahidas Prabhanjan, Sunnyvale, CA (US); Lisa H. Nguyen, San Jose, CA (US); David Tseng, Fremont, CA (US)

(73) Assignee: Tellabs San Jose, Inc., Naperville, IL (US)

( * ) Notice: Subject to any disclaimer, the term of this patent is extended or adjusted under 35 U.S.C. 154(b) by 778 days.

(21) Appl. No.: 11/488,464

(22) Filed: Jul. 17, 2006

(65) Prior Publication Data

US 2007/0233887 A1 Oct. 4, 2007

Related U.S. Application Data

(60) Provisional application No. 60/786,893, filed on Mar. 28, 2006.

(51) Int. Cl.
*G06F 15/16* (2006.01)
(52) U.S. Cl. .................. 709/230; 709/223; 370/254; 370/252; 370/351; 455/432.1
(58) Field of Classification Search ........... 709/230, 709/233; 370/254, 351, 252; 455/432.1
See application file for complete search history.

(56) References Cited

U.S. PATENT DOCUMENTS

| 6,118,784 | A * | 9/2000 | Tsuchiya et al. ......... 370/401 |
| 6,339,595 | B1 * | 1/2002 | Rekhter et al. .......... 370/392 |
| 6,865,184 | B2 * | 3/2005 | Thubert et al. .......... 370/401 |
| 7,539,164 | B2 * | 5/2009 | Maenpaa et al. ........ 370/331 |
| 2002/0012320 | A1 * | 1/2002 | Ogier et al. ............ 370/252 |
| 2003/0179742 | A1 * | 9/2003 | Ogier et al. ............ 370/351 |
| 2005/0078824 | A1 * | 4/2005 | Malinen et al. |
| 2005/0083886 | A1 * | 4/2005 | Ikeda |
| 2006/0003765 | A1 * | 1/2006 | Patil et al. ............ 455/432.1 |

(Continued)

FOREIGN PATENT DOCUMENTS

JP 2006025341 A * 1/2006

OTHER PUBLICATIONS

"The Open Group, IPv6 Support in UNIX® Sockets," [online], 1999 [retrieved on Apr. 20, 2007]. Retrieved from the Internet: <http://www.opengroup.org/platform/xnetipv6.htm.>.

(Continued)

*Primary Examiner*—Alina N. Boutah
(74) *Attorney, Agent, or Firm*—Hamilton, Brook, Smith & Reynolds, P.C.

(57) ABSTRACT

A method or apparatus in an exemplary embodiment supports first and second layer network nodes that may be configured to communicate with each other via a communications path. In embodiments a first network node communicates via a second network node across a layer 2 network to send data. The first network node is typically on a different link layer protocol than the second network node receiving the data. Thus, the first and second layer network nodes, having different link layer protocols, may communicate with each other. Accordingly, through use of embodiments of this invention, Neighbor Discovery (ND) is possible in a network, such as an IPv6 network, that has protocols incompatible with each other.

20 Claims, 7 Drawing Sheets

U.S. PATENT DOCUMENTS

| | | | |
|---|---|---|---|
| 2006/0101340 A1* | 5/2006 | Sridhar et al. | 715/734 |
| 2006/0184663 A1* | 8/2006 | Takahashi et al. | 709/224 |
| 2007/0030855 A1* | 2/2007 | Ribiere et al. | 370/401 |
| 2007/0130427 A1* | 6/2007 | Lahti et al. | 711/133 |
| 2007/0204155 A1* | 8/2007 | Dutta et al. | 713/168 |
| 2007/0237161 A1* | 10/2007 | Akisada | 370/400 |
| 2007/0274232 A1* | 11/2007 | Axelsson et al. | 370/254 |
| 2007/0280249 A1* | 12/2007 | Draves, Jr. | 370/392 |
| 2008/0046597 A1* | 2/2008 | Stademann et al. | 709/249 |
| 2008/0051036 A1* | 2/2008 | Vaswani et al. | 455/69 |
| 2008/0062958 A1* | 3/2008 | Jonsson et al. | 370/350 |
| 2009/0238139 A1* | 9/2009 | Kim et al. | 370/331 |

OTHER PUBLICATIONS

Gilligan, R., et al., "Basic Socket Interface Extensions for IPv6," Informational Memo [online], 1997 [retrieved on Apr. 27, 2007]. Retrieved from the Internet: <http://www.ietf.org/rfc/rfc2133.txt.>.

Stevens, W. and Thomas, M., "Advanced Sockets API for IPv6," Informational Memo [online], 1998 [retrieved on Apr. 27, 2007]. Retrieved from the Internet: <http://www.ietf.org/rfc/rfc2292.txt.>.

Deering, S. and Hinden, R., "Internet Protocol, Version 6 (IPv6) Specification," Retrieved from the Internet: <http://www.ietf.org/rfc/rfc2460.txt.>.

Narten, T. and Nordmark, E., "Neighbor Discovery for IP Version 6 (IPv6)," Retrieved from the Internet: <http://www.ietf.org/rfc/rfc2461.txt.>.

Thomson, S., and Narten, T., "IPv6 Stateless Address Auto-Configuration," Retrieved from the Internet: <http://www.ietf.org/rfc/rfc2462.txt.>.

Conta, R., and Deering, S., "Internet Control Message Protocol (ICMPv6) for the Internet Protocol Version 6 (IPv6) Specification," Retrieved from the Internet: <http://www.ietf.org/rfc/rfc2463.txt.>.

Crawford. M., "Transmission of IPv6 Packets Over Ethernet Networks," Retrieved from the Internet: <http://www.ietf.org/rfc/rfc2464.txt.>.

Armitage, G., et al., "IPv6 Over ATM Networks," Retrieved from the Internet: <http://www.ietf.org/rfc/rfc2492.txt.>.

Conta, R., et al., "Transmission of IPv6 Packets over Frame Relay Networks Specification," Retrieved from the Internet: <http://www.ietf.org/rfc/rfc2590.txt.>.

Conta, R., "Extensions to IPv6 Neighbor Discovery for Inverse Discovery Specification," Retrieved from the Internet: <http://www.ietf.org/rfc/rfc3122.txt.>.

Hinden, R., and Deering, S., "Internet Protocol Version 6 (IPv6) Addressing Architecture," Retrieved from the Internet: <http://www.ietf.org/rfc/rfc3513.txt.>.

Draves, R., "Default Address Selection for Internet Protocol version 6 (IPv6)," Retrieved from the Internet: <http://www.ietf.org/rfc/rfc3484.txt.>.

Kent, S. and Atkinson, R., "IP Encapsulating Security Payload (ESP)," Retrieved from the Internet: <http://www.ietf.org/rfc/rfc2406.txt.>.

Shah, H., et al., "ARP Mediation for IP Interworking of Layer 2 VPN," Retrieved from the Internet: <http://tools.ietf.org/html/draft-shah-12vpn-arp-mediation-03>.

* cited by examiner

PE 315 Cross Connect Mapping ⟵ 370

| Cross Connect | Local CE IP | Local CE MAC | Remote Peer CE IP |
|---|---|---|---|
| CC 1 (VLAN 1) | fe80::c<br>2001:1:1:1::c | 00:02:A7:00:11:50 | fe80::1<br>2001:1:1:1::1 |
| CC 2 (VLAN 2) | 10.2.0.1<br>fe80::d<br>2001:1:1:2::d | 00:02:A7:00:11:50 | 10.2.0.2<br>fe80::a<br>2001:1:1:2::a |

PE 325 Cross Connect Mapping ⟵ 375

| Cross Connect | Local CE IP | Remote Peer CE IP |
|---|---|---|
| CC 1 (DLCI 1) | fe80::1<br>2001:1:1:1::1 | fe80::c<br>2001:1:1:1::c |
| CC 2 (VPI/VCI 1/1) | 10.2.0.2<br>fe80::a<br>2001:1:1:2::a | 10.2.0.1<br>fe80::d<br>2001:1:1:2::d |

METHOD AND APPARATUS FOR NEIGHBORHOOD DISCOVERY ACROSS DISPARATE POINT-TO-POINT NETWORKS

RELATED APPLICATION(S)

This application claims the benefit of U.S. Provisional Application No. 60/786,893, filed on Mar. 28, 2006. The entire teachings of the above application are incorporated herein by reference.

BACKGROUND OF THE INVENTION

The Internet today is growing rapidly. Due to this rapid growth, Internet Protocol Version 4 (IPv4) is beginning to have problems, such as a growing shortage of IPv4 addresses. To combat these types of problems in IPv4, Internet Protocol Version 6 (IPv6) can be used.

SUMMARY OF THE INVENTION

A method or corresponding apparatus in an exemplary embodiment of the present invention supports communications between network nodes using different communications protocols, such as supporting communications for IPv6 network nodes using different communications protocols (e.g., Frame Relay and Ethernet) in a layer 2 network. First and second layer B (e.g., layer 2) switch network nodes may be configured to communicate with each other via a communications path. A first layer A (e.g., layer 3) network node may be configured to communicate with a second layer A network node, where each layer A network node may communicate locally with respective layer B network nodes using different link layer protocols. Further, a first or second discovery unit may be configured to operate in connection with respective first and second layer B network nodes to determine respective unique identifiers associated with the layer A network nodes. In addition to determining respective unique identifiers, the first or second discovery units may also be configured to exchange the unique identifiers with each other. The first or second discovery unit may also provide the unique identifier of the distal layer A network node to the respective local layer A network nodes.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

In an Internet Protocol Version 6 (IPv6) protocol, Neighbor Discovery (ND) is incompatible during communications between network nodes interconnected using a switched layer 2 network. For example, ND does not allow a network node using an Ethernet link to connect with a second router using a Frame Relay (FR) link. Therefore, there is a need in the industry to provide a way to connect network nodes, operating on different link layers, using ND of the IPv6 protocol.

A method or corresponding apparatus in an exemplary embodiment of the present invention supports communications between network nodes using different communications protocols, such as supporting communications for IPv6 network nodes using different communications protocols (e.g., Frame Relay and Ethernet) in a layer 2 network. First and second layer B (e.g., layer 2) switch network nodes may be configured to communicate with each other via a communications path. A first layer A (e.g., layer 3) network node may be configured to communicate with a second layer A network node, where each layer A network node may communicate locally with respective layer B network nodes using different link layer protocols. These layer B network nodes may be on a point to point network and/or a switched network. Further, the layer B network nodes may operate over Ethernet, VLAN, Frame Relay, or ATM.

A first or second discovery unit may be configured to operate in connection with respective first and second layer B network nodes to determine respective unique identifiers associated with the layer A network nodes. Using the unique identifiers allows a first or second discovery unit communicates with a layer A network node. In addition to determining respective unique identifiers, the first or second discovery units may also be configured to exchange the unique identifiers with each other. The first or second discovery unit may also provide the unique identifier of the distal layer A network node to the respective local layer A network nodes. Further, the first or second discovery units may include an interception unit to intercept a message; and the first or second discovery units are configured to send a response based on the message.

Figure 1:
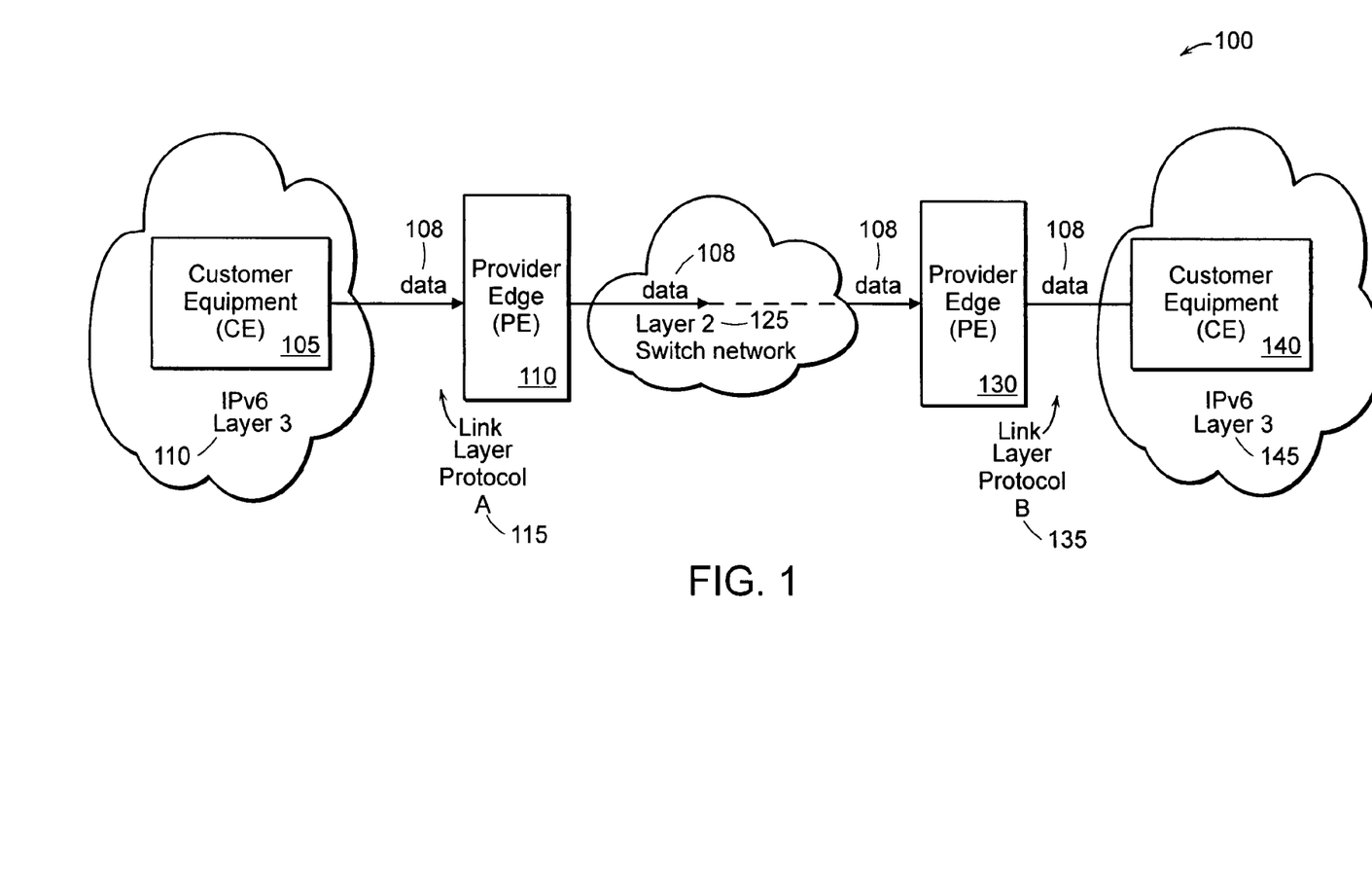
FIG. 1 is a network diagram of a network depicting network nodes communicating with each other using an example embodiment of the present invention.

FIG. 1 is a network diagram of a network 100 depicting multiple network nodes communicating with each other. In this network 100, a Customer Equipment (CE) server 105 is shown within an IPv6 Layer 3 protocol 110. CE 105 may be connected to a Provider Edge (PE) router 110 where the PE is communicating via a link layer protocol A 115.

A Customer Equipment (CE) server 140 is shown within an IPv6 Layer 3 protocol 145. The CE 140 may be connected to a Provider Edge (PE) router 130, where the PE 130 is communicating via a link layer protocol B 135. Since the CE servers 105 and 140 are operating on different link layer protocols, the CE servers 105 and 140 are not able to communicate. To overcome this problem, the CE server 105 may send data 108 to the PE router 110 on link layer protocol A (e.g., Frame Relay). In turn, the PE router 110 sends data 108 over a layer 2 switch network 125 to the PE router 130. The PE router 130, operating on a link layer protocol B 135 (e.g., Ethernet), receives data 108. The PE router 130 recognizes the data 108 even though the data 108 is transmitted from a different link layer. The PE router 130, compatible with the CE server 140, transmits the data 108 to the CE server 140 successfully. In this way, the data 108 is sent across a network by the PE router 110 and the PE router 130 using different link layer protocols.

Figure 2A:
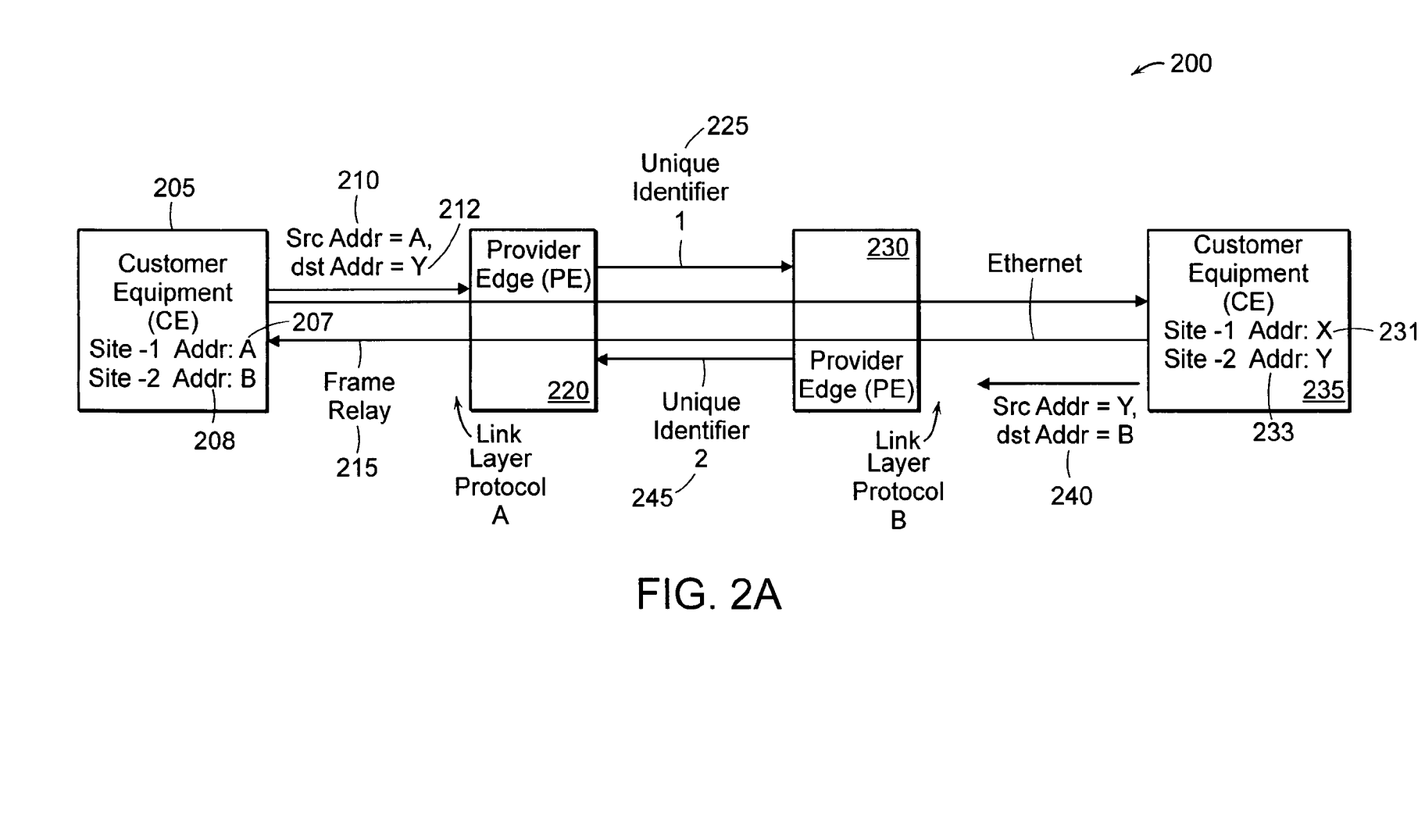
FIG. 2A is a network diagram of a network transmitting network information using an embodiment of the present invention.

FIG. 2A is a network diagram 200 illustrating network nodes communication over different link layer protocols. In this network 200, two CE servers, the CE server 205 and the CE server 235, are connected using IP layer 2 interworking circuit (not shown). Each CE may be connected to a respective PE 220 and 230. An interface from CE server 205 to a PE router 220 may use Frame-Relay where an interface from the CE server 235 to the PE router 230 may use Ethernet. The CE server 205 and the CE server 235 each have two site-local addresses assigned to their interface. That is, address A 207 is assigned for site-1 and address B 208 is assigned for a site-2 on the CE server 205. Similarly, an address X 231 is assigned for site-1 and address Y 233 may be assigned for site-2 on the CE server 235.

An application, such as a routing protocol on the CE server 205, may discover address Y 233 (site-2 on the CE server 235) and plan to establish a session with address Y 233. Likewise, the CE server 235 may discover (i) address A 207 (site-1 on the CE server 205) and (ii) a source address 210 on the CE server 205 for destination address Y 212, which is also address A 207. In order for the CE server 205 or the CE server 235 to establish a session, the PE router 230 discovers address Y 235 of the CE server 235. However, if CE 235 sends an ND Solicitation for address A 207, address X 231 is used as the source address (not shown) of the Solicitation message. Therefore, address X 231 belongs to the same site (site-1) as address A 207.

Referring now to the PE router 230, the PE router 230 uses ND messages to discover the CE server's 235 addresses. If no ND message occurs, the PE router 230 may not discover address Y 233 without communication to the site-2 addresses from the CE server 235. This may result in a failed session for both the CE server 205 and the CE server 235.

In order to avoid these kinds of situations when dynamic learning is used on Ethernet/VLAN interfaces, either the CE server 205 or 235 may use the same Interface-Id for all of its IPv6 addresses on the interface so that valid addresses are learned though the use of ICMPv6 Router Discovery Solicitation or Advertisement messages. Another alternative is to statically configure each CE address on each PE.

The above example embodiment is not only applicable to interfaces of ATM or Frame-Relay type, but many interfaces. This is the case because a CE's Advertisement response to an InvND Solicitation message from the PE contains all the IPv6 addresses of the interface in Target Address List. Thus, the PE may learn all the IPv6 addresses of the CE's attaching interface, even if the interface is different.

Figure 2B:
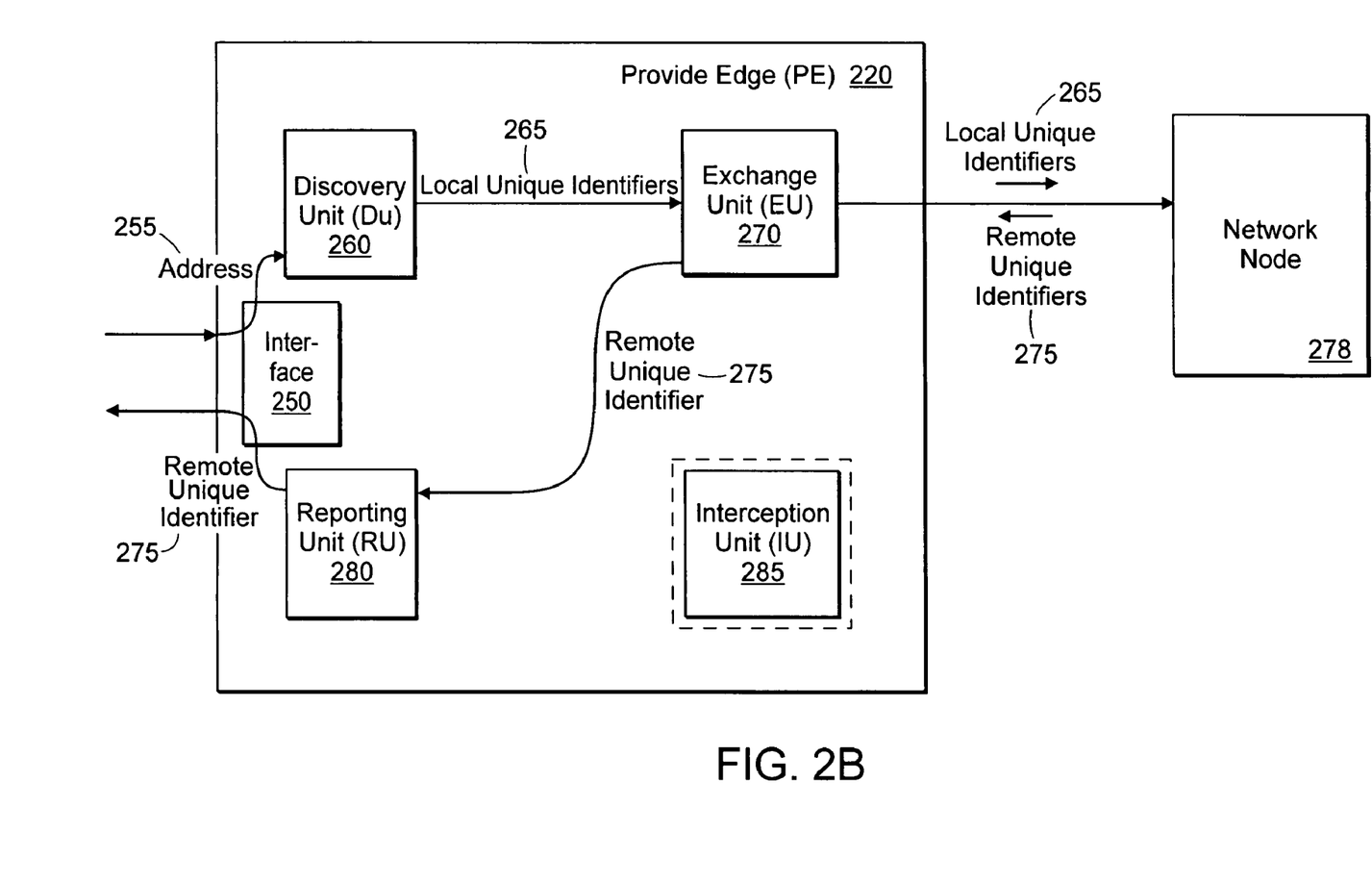
FIG. 2B shows a detailed diagram of how processing of a Provider Edge (PE) router determines unique identifiers of a network node.

FIG. 2B shows a detailed diagram of how processing of a Provider Edge (PE) router 220 determines unique identifiers of a network node 278. To begin, an address 255, received from an originating node (not shown), is passed through an interface 250 to a Discovery Unit (DU) 260. In turn, the DU 260 sends the local unique identifiers 265 to an Exchange Unit (EU) 270. Next, the EU 270 sends the local unique identifiers 265 to the network node 278 (e.g., a second PE router) to exchange unique identifiers. That is, the network node 278, upon receipt of the local unique identifiers 265, returns remote unique identifiers 275 to the EU 270. Upon receiving the remote unique identifiers 275, the EU 270 sends the remote unique identifiers 275 to a Reporting Unit (RU) 280. The RU 280 sends the remote unique identifiers 275 through the interface 250 to the originating node (not shown). While obtaining the remote unique identifiers 275, a message (not shown) may be received by the EU 270. Upon receiving the message, the message may be intercepted by an Interception Unit (IU) 285. Further, if the intercepted message requires a response, the IU 285 will provide an appropriate response. It is useful to note that intercepting a message and sending a required response may be performed at any time (e.g., upon receiving a message). Moreover, although units are illustrated in FIG. 2B (among others) as a path between the DU 260, EU 270, RU 280, and IU 285, in other embodiments, such as a hardware, firmware, or software embodiment performing the tasks of both the DU 260, EU 270, RU 280, and IU 285 there may not be a specific physical or logical path.

Figure 3:
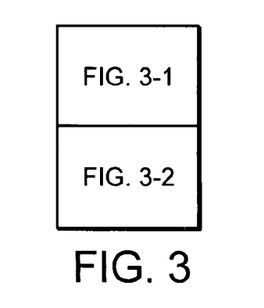
FIG. 3 is a network diagram of a network depicting network communications via layer 3 protocol(s)

FIG. 3 is a network diagram 300 illustrating network nodes communicating over more than one different link layer protocols. In this network 300, three CE servers, the CE servers 305, 340, and 345, may be connected using IP layer 2 interworking cross-connect circuits (CC) 310, 320, 330, 355, 360, and 365. Each CE server may be connected to a respective PE router 315 and 325. An interface from the CE server 305 to the PE router 315 may use Ethernet where the interface from the CE server 340 to the PE router 325 may use Frame Relay and the interface from the CE server 345 to the PE router 325 may use ATM. With each CE server having a different interface, the PE router 315 and the PE router 325 create a respective cross connect mapping 370 and 375. These cross connect mappings 370 and 375 allow a local CE server such as the CE server 305, to communicate with a remote CE server such as the CE server 340. For example, the CE server 305 may use the CC 310 to connect to the PE router 315. In turn, the PE router 315 uses the CC 320 to connect to the PE router 325. In this case, the PE router 325 may look to the cross connect mapping 375 to determine the local IP address of the CE server 235. Since the PE router 325 knows the location of the CE server 340, the CE server 305 can communicate with the CE server 340 regardless of having different link layer protocols. It is useful to note that similar communications can be performed from the CE server 345 using the CC 355, 360, and 365.

Figure 4:
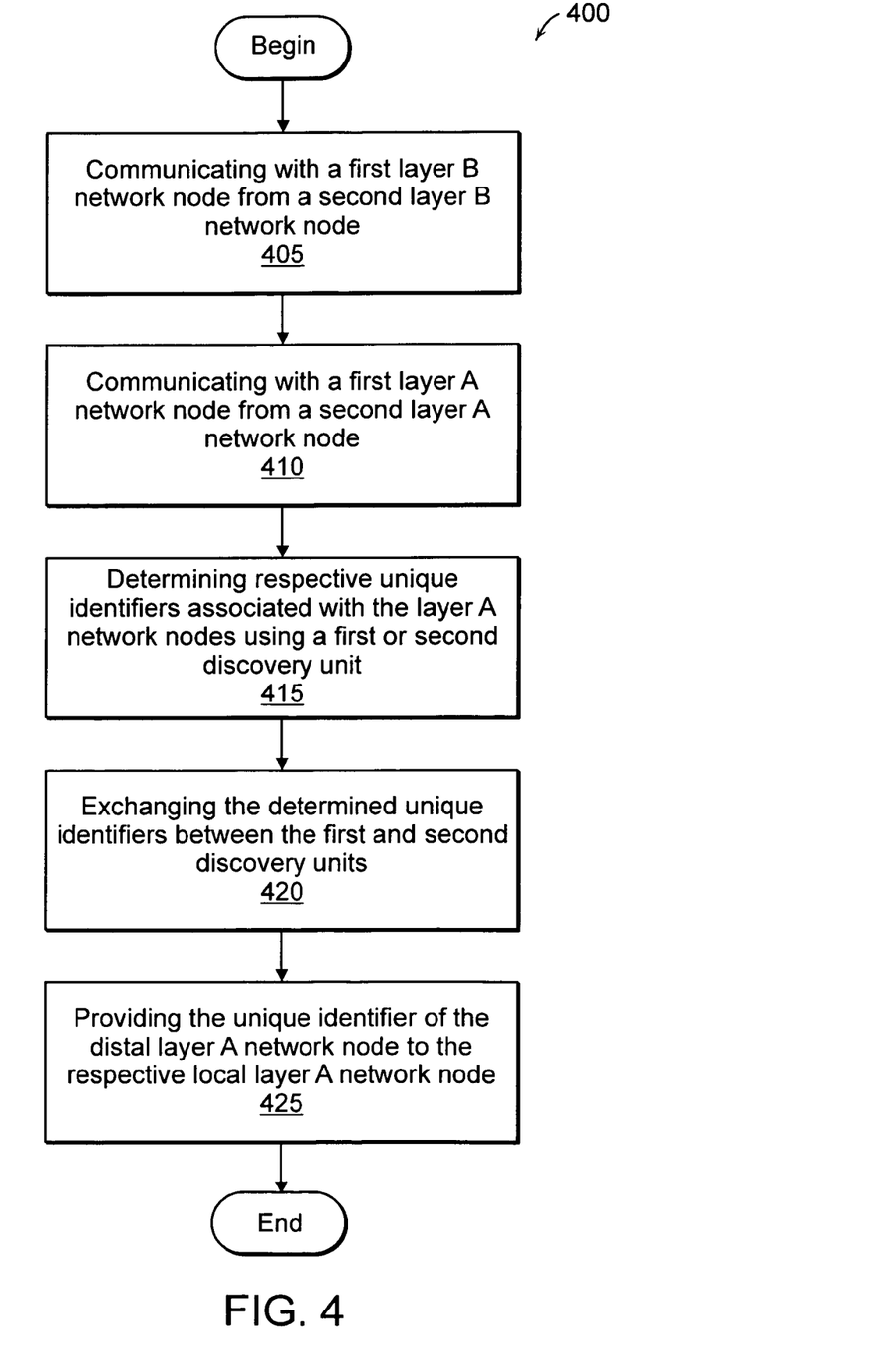
FIG. 4 is a flow diagram of an example technique of communicating between network nodes according to an embodiment of the present invention.

FIG. 4 is a flow diagram 400 illustrating network nodes communicating over different link layer protocols. After beginning, the process communicates with a first layer B network node such as a switched network node, from a second layer B (switched) network node (405), a switched network node. Then, a first layer A network node communicates with a second layer A network node (410). Next, a first or second discovery unit determines respective unique identifiers associated with the layer A network nodes (415). After determining the respective unique identifiers, the first and second discovery units exchange the unique identifiers with each other (420). Finally, the discovery units provide the unique identifiers of a distal layer A network node to respective local layer A network node (425).

Figure 5:
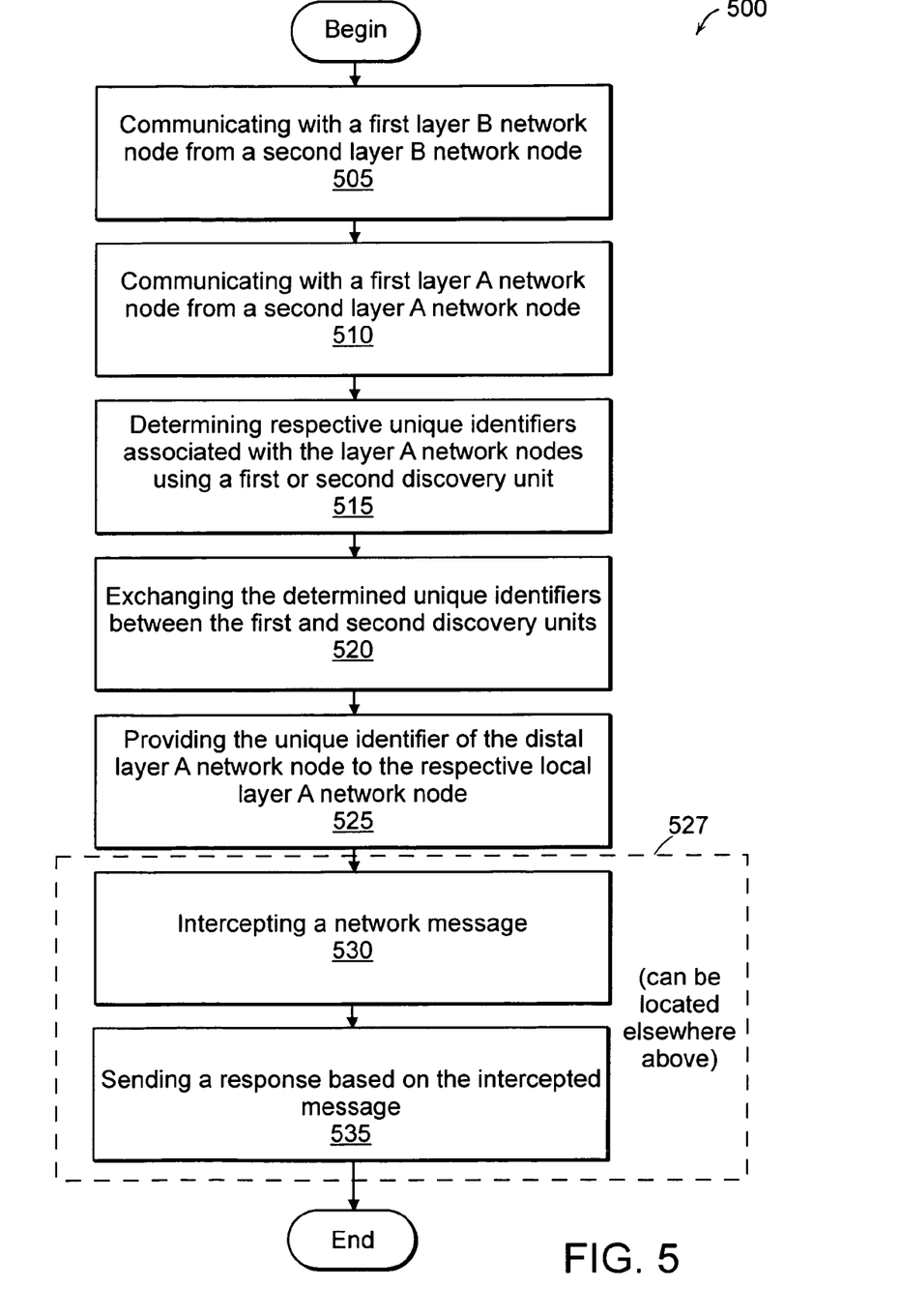
FIG. 5 is flow diagram corresponding to communicating between network nodes.

FIG. 5 is a flow diagram 500 depicting network nodes communicating over different link layer protocols and intercepting network messages. After beginning, the process communicates with a first layer B network node, such as a switched network node, from a second layer B (switched) network node (505). Then a first layer A network node communicates with a second layer A network node (510). Next, a first or second discovery unit determines respective unique identifiers associated with the layer A network nodes (515). After determining the respective unique identifiers, the first and second discovery units exchange the unique identifiers with each other (520). The discovery units then provide the unique identifiers of a distal layer A network node to respective local layer A network nodes (525). While obtaining the unique identifiers, the first or second discovery unit may also intercept a network message (530). If the network message requires a response, the first or second discovery unit may send an appropriate response (535). It is useful to note intercepting a network message (530) and sending a required response (535) may be performed at any time (527).

EXAMPLE

Determining IPv6 Address(es) of a CE

IPv6 is a standard use to communicate between network nodes. IPv6 standards allow an IPv6 node to have multiple unicast addresses on the same interface. All these addresses can be of different scope (e.g., link-local, site-local, or global). Therefore, an IPv6 router may have one link-local address, one or more site-local addresses, or one or more global addresses on the same interface. In addition, an IPv6 router may also have one or more anycast addresses configured on an interface.

In an IPv4 implementation, there are two ways a PE can become aware of the IPv4 address on the attaching interface of the CE device:

(1) Static configuration
(2) Dynamic learning/gleaning.

However, in an IPv6 protocol, there are several types of IPv6 addresses (e.g., anycast and global addresses beginning with binary 000) that present difficulties for dynamic learning by a PE. If such addresses are configured on the attaching interface of a CE, the PE may not learn them dynamically, and static configuration of those addresses may be the only alternative to ensure proper operation of the IP layer 2 interworking circuit. In order to allow the static configuration of such addresses and dynamic learning/gleaning of the rest, a mixed configuration mode is supported for IPv6 addresses. In one embodiment of the present invention, three configuration modes are allowed. These configuration modes are static, dynamic, and mixed.

In a static configuration, the user configures all IPv6 addresses of the CE device's interface for proper operation of the IP layer 2 interworking circuit. If an address is not configured, but is subsequently discovered in the process of proxying, the following occurs: (1) the circuit is set operationally down with a reason of 'Configured Address Mismatch' if one IPv6 static address is configured on the PE; and (2) the address is ignored if more than one IPv6 address is configured on the PE. In a dynamic configuration, no address is a static configuration. Addresses are dynamically learned by a PE. In a mixed mode, some addresses are static configurations while the remaining addresses are learned dynamically.

Dynamic Learning of CE's Address(es)

Dynamic learning is used in the absence of a static configuration of CE's IPv6 addresses. Some of many ways of determining the IPv6 addresses of an interface are:

(1) Using PE initiated ICMPv6 Router Discovery Solicitation and Advertisement messages.
(2) Intercepting CE generated ICMPv6 Neighbor/Inverse-Neighbor Discovery Solicitation and Advertisement messages.
(3) Intercepting any other CE generated IPv6 multicast messages when the circuit is initially down and the PE has not learned any of CE's addresses. The destination IPv6 address of the message is from the "non-forwardable" multicast address space. The CE's address is then obtained directly from the source address field of the IPv6 header. Obtaining the source address directly is used when the circuit is operationally down and the PE has not determined any of the addresses of CE. Therefore, a source address field is used to learn a first address (in no reference to any specific/particular address) of the CE.

Based on the current implementation for IPv4 CE devices, the operational state of a circuit is down until at least one IPv6 address of both the local and remote CE is known. Since the PE has no knowledge of the number of IPv6 addresses configured on the interface of the CE device, it cannot wait until all those addresses are determined for the circuit to be operational. Therefore, IPv6 addresses are determined. Determining IPv6 addresses is performed by sending ND Solicitation messages to a CE for those addresses that are determined (this is referred to herein as "Unreachability detection"). This is performed on a per IP layer 2 interworking circuit endpoint basis, such as enable/disable and timeout in seconds.

ICMPv6 Router Discovery

After establishing connectivity to an attached CE device (administrative state of a circuit is enabled, physical operation status is UP/layer 2 interface UP, Data Link Connection Identifier (DLCI) UP, etc.), and the PE sends IPv6 Router Discovery Solicitation ND messages (the use of such messages is configurable on a per-circuit endpoint basis). In response to the PE message(s), the CE device sends an IPv6 Router Discovery Advertisement ND message. A flag is defined (e.g., AdvSendAdvertisements) and maintained per interface on the CE and configured by a user. This flag indicates whether or not the CE should respond to Router Discovery Solicitation ND messages. In addition, a source address field in IPv6 header of the Advertisement message is set to the link-local address of the CE device. Further, this Advertisement message contains a list of CE prefixes that are on-link and/or used for address auto-configuration.

All IPv6 addresses, except for global addresses beginning with binary 000, have a 64-bit prefix and a 64-bit Interface-Id. Since IPv6 addresses, except for the global address(es) beginning with binary 000, are made up of the same 64-bit Interface-Id, then the Interface-Id is obtained from the link-local address of the CE. The remaining addresses are constructed by concatenating a prefix (from the prefix-list in the Advertisement message) and the Interface-Id. After constructing the addresses, ND Solicitation message is sent by the PE for each of the addresses. An address is found invalid if a response is not obtained from the CE. In this way, the PE learns each IPv6 address of the CE. On the other hand, if the PE does not receive an ND Advertisement message in response to an ND Solicitation message, those addresses are not valid. If the addresses are not valid, the PE relies on other processes to learn the CE addresses. Example processes include ICMPv6, Neighbor Discovery, and static configuration.

ICMPv6 Neighbor/Inverse-Neighbor Discovery Messages

Neighbor Discovery (ND) Solicitation and Advertisement messages are used to find the link-layer address of a node by using the IPv6 address. On the other hand, Inverse Neighbor Discovery (InvND) Solicitation and Advertisement messages serve the opposite purpose on ATM and Frame-Relay links; that is, IPv6 address(es) are found for a node by using its link-layer address.

In one embodiment of the present invention, an IPv6 address assigned to an interface of a CE is learned by a PE by performing the following:

(1) the CE sends an ND/InvND Solicitation message. After sending the ND Solicitation message, a source address field in an IPv6 header is checked to determine if an IPv6 address has been assigned to the interface of the CE. If the address is all zeros, the IPv6 address is considered unspecified. If, on the other hand, the IPv6 address is specified, and the specified address is assigned to the interface from which the message is sent. Similarly, in the case of an InvND Solicitation message, the source address field in the IPv6 header contains an IPv6 address assigned to the CE's attaching interface; or (2) the CE sends an Unsolicited ND Advertisement or a Solicited InvND Advertisement message. If an Unsolicited ND Advertisement message is sent, the IPv6 address is obtained from the source address field of the IPv6 header and/or from a Target Address field in the ND message. In case of Solicited InvND Advertisement message, the Target Address List in the InvND message contains the list of IPv6 addresses assigned to the attaching interface of the CE.

Anycast Addresses

An IPv6 anycast address is defined as an address that is assigned to more than one interface typically belonging to different nodes, with a property that a packet sent to an anycast address is delivered to the nearest interface with that address. Anycast addresses are allocated from the unicast address space and are syntactically indistinguishable from unicast addresses.

Anycast address prefixes are not included in ICMPv6 Router Discovery Advertisement messages. However, there is a predefined Subnet-Router anycast address which is defined to be same as the subnet prefix. All routers are required to support the Subnet-Router anycast addresses for all the subnets to which they are connected. These anycast addresses are obtained directly from the prefix list in the Router Discovery Advertisement message. Other anycast address(es) configured on the interface of the CE device is/are learned from ND Advertisement message(s) from the CE, or it/they is/are statically configured on the PE. Anycast addresses are typically used in point-to-point (e.g., IP layer-2 interworking) networks.

PE Proxying

The PE may act as a proxy server to the local CE containing the IPv6 addresses of the remote CE. To behave as a proxy, the PE intercepts some or all the messages in the IPv6 to link-layer address binding from the local CE, and, if required, respond to these messages. These messages are typically the ND, InvND Solicitation, and Advertisement messages. The messages are intercepted by the local-PE and, thus, may not be forwarded to the remote PE, regardless of the operational state of the circuit. The ND and InvND messages are typically ICMPv6 packets that are of unicast or limited multicast scope. Since the PE intercepts these messages, the PE has to determine the addresses for each ICMPv6 message from the local CE and terminate the messages.

Terminating ND and InvND messages is done in real time within the PE's hardware. This type of real-time processing is burdensome to a PE's packet processing requirement. In order to minimize the burden on the PE's packet processing requirements, it may be assumed that the ND/InvND messages do not have IPv6 Extension Headers. This assumption may be made because the ND/InvND messages are of a link-local scope and do not contain any of the following headers: Hop-by-Hop, Routing, Fragment, and Destination Options Extension Headers.

Distribution of IPv6 Address(es) to Remote-PE

The local-PE distributes the IPv6 addresses to a remote PE in order for the remote PE to act as a proxy server for the IPv6 addresses of the local-CE. The following approach may be taken for advertising and withdrawing multiple IPv6 addresses:

In the Label Distribution Protocol (LDP) label mapping message, the IPv6 or IPv4 mode may be signaled to the remote-PE through one of two ways:

1. A new stack-mode (IPv4, IPv6, dual-stack) Type Length Value (TLV)
2. Reusing one of the existing interface parameters that are not used by an IP layer 2 interworking circuit. Example parameters may include: maximum number of concatenated ATM cells, CEM payload size, and CEM option. Note 2-bits are needed to signal the stack-mode Circuit Operation in Dual-Stack Mode Dual-Stack mode allows the CE devices to run both an IPv4 and IPv6 stack on the same directly connected interface, and the IP layer 2 interworking circuit on the PE side may mediate for both types of addresses independently. Thus, the PE may maintain a separate circuit state for IPv4 and IPv6 in the following example states: IPv4 connectivity is operationally UP only when both the local and remote IPv4 addresses are known; IPv6 connectivity is UP only when at least one local and one remote IPv6 address is known. Unicast IPv6 packets are not forwarded in one embodiment when the IPv6 connection state is operationally DOWN even if IPv4 connection state is operationally UP, and vice-versa. A Command Line Interface (CLI) "show" command output may display the operational state of both IPv4 and IPv6 connections, in addition to the learned local/remote addresses for both.

Note that in an example dual-stack mode of operation, a circuit endpoint may have CE IPv4 addresses statically configured and CE IPv6 addresses dynamically learned (and vice versa).

While this invention has been particularly shown and described with references to example embodiments thereof, it will be understood by those skilled in the art that various changes in form and details may be made therein without departing from the scope of the invention encompassed by the appended claims.

For example, example embodiments are described for IPv6. It should be understood that other embodiments of the invention may be applied to other and future versions of IP or other network communication protocols. In addition, although example embodiments of the present invention are described in reference to layer 2 and layer 3 communications layers, it should be understood that the same or other embodiments may be employed in networks using different layer naming conventions, numbering systems, more or fewer lower layers to move layers 2 and 3 to higher or lower numbered layers, and so forth.

It should be understood that any of the embodiments disclosed herein, such as communicating over network nodes having different link layer protocols or the flow diagrams of FIGS. 4 and 5, may be implemented in the form of hardware, firmware, or software. If implemented in software, the software may be processor instructions in any suitable software language and stored on any form of computer readable medium. The processor instructions are loaded and executed by a processor, such as a general purpose or application specific processor, that, in turn, performs the example embodiments disclosed herein.

What is claimed is:

1. A network, comprising:
   first and second link layer network nodes communicating with each other via a communications path, the first and second link layer network nodes being layer 2 network nodes;

a first network layer network node communicating with a second network layer network node, each network layer network node communicating locally with respective link layer network nodes using different Internet Protocol (IP) link layer protocols, the first and second network layer network nodes being layer 3 network nodes; and first and second discovery units, exchange units, and reporting units configured to operate in connection with respective first and second link layer network nodes to determine respective unique identifiers associated with the network layer network nodes, to exchange the unique identifiers with each other, and to provide the unique identifier of a distal network layer network node to the respective local network layer network nodes.

2. The network of claim 1 wherein the different IP link layer protocols are IPv6 protocols.

3. The network of claim 1 wherein the first and second link layer network nodes are switched network nodes.

4. The network of claim 1 wherein the first and second link layer network nodes are on a point to point network.

5. The network of claim 1 further including an interception unit to intercept a message and the first or second discovery units are configured to send a response based on the message.

6. The network of claim 1 wherein the first discovery unit communicates with the second network layer network node.

7. The network of claim 1 wherein the link layer protocols are selected from a group consisting of: Ethernet, VLAN, Frame Relay, or ATM.

8. A method for communicating between network nodes, comprising:
    communicating with a first link layer network node from a second link layer network node, the first and second link layer network nodes being layer 2 network nodes;
    communicating with a first network layer network node from a second network layer network node, each network layer network node communicating locally with respective link layer network nodes using different Internet Protocol (IP) link layer protocols, the first and second network layer network nodes being layer 3 network nodes;
    determining respective unique identifiers associated with the network layer network nodes;
    exchanging the unique identifiers; and
    providing the unique identifier of a distal network layer network node to the respective local network layer network node.

9. The method of claim 8 wherein the different IP link layer protocols are IPv6 protocols.

10. The method of claim 8 wherein the first and second link layer network nodes are switched network nodes.

11. The method of claim 8 further including intercepting a network message and sending a response based on the network message.

12. The method of claim 8 further including using the unique identifiers to provide a communications path between the first network layer network node and the second network layer network node.

13. The method of claim 8 wherein the link layer protocols are selected a group of consisting of: Ethernet, VLAN, Frame, Relay, or ATM.

14. A network node computing system, comprising:
    a discovery unit to determine unique identifiers associated with a local network layer network node;
    an exchange unit to exchange the unique identifier with an exchange unit in a link layer network node; and
    a reporting unit configured to provide a unique identifier of a distal network layer 3 network node received from the exchange unit in the link layer network node,
    wherein the network node computing system communicates with the local network layer network node using a first Internet Protocol(IP)link layer protocol; and
    wherein the link layer network node communicates with the distal network layer 3 network node using a second IP link protocol.

15. The network node computing system of claim 14:
    wherein the first and second IP link layer protocols are IPv6 protocols.

16. The network node computing system of claim 14 wherein the network node of the network node computing system and the link layer network node are switched network nodes.

17. The network node computing system of claim 14 wherein the network node of the network node computing system and the link layer network node are on a point to point network.

18. The network node computing system of claim 14 further including an interception unit to intercept a message, and wherein the discovery unit is configured to send a response based on the message.

19. The network node computing system of claim 14 wherein the discovery unit communicates with the distal network layer 3 network node.

20. The network node computing system of claim 14 wherein network layer network nodes communicate with link layer network nodes using link layer protocols selected from a group consisting of: Ethernet, VLAN, Frame Relay, or ATM.

* * * * *